US008216680B2

(12) United States Patent
Hsu et al.

(10) Patent No.: US 8,216,680 B2
(45) Date of Patent: Jul. 10, 2012

(54) TRANSPARENT COMPOSITE CONDUCTORS HAVING HIGH WORK FUNCTION

(75) Inventors: Che-Hsiung Hsu, Clemmons, NC (US); Hjalti Skulason, Buellton, CA (US); Daniel David Lecloux, Midland, MI (US); Eric Maurice Smith, Hockessin, DE (US); Shawn Yeisley, Newport, DE (US); Robert Clayton Wheland, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 711 days.

(21) Appl. No.: 11/700,456

(22) Filed: Jan. 31, 2007

(65) Prior Publication Data

US 2008/0003449 A1 Jan. 3, 2008

Related U.S. Application Data

(60) Provisional application No. 60/765,031, filed on Feb. 3, 2006.

(51) Int. Cl.
*B32B 15/082* (2006.01)
*B32B 27/06* (2006.01)
*B32B 27/30* (2006.01)

(52) U.S. Cl. ......................... 428/421; 428/457; 428/702

(58) Field of Classification Search ........................ None
See application file for complete search history.

(56) References Cited

U.S. PATENT DOCUMENTS

| | | | |
|---|---|---|---|
| 3,282,875 | A | 11/1966 | Connolly et al. |
| 4,358,545 | A | 11/1982 | Ezzell et al. |
| 4,433,082 | A | 2/1984 | Grot |
| 4,552,927 | A | 11/1985 | Warren |
| 4,731,408 | A | 3/1988 | Jasne et al. |
| 4,795,543 | A | 1/1989 | Stetter |
| 4,869,979 | A | 9/1989 | Ohtani et al. |
| 4,940,525 | A | 7/1990 | Ezzell et al. |
| 4,959,430 | A | 9/1990 | Jonas et al. |
| 5,002,700 | A | 3/1991 | Otagawa et al. |
| 5,069,820 | A | 12/1991 | Jen et al. |
| 5,160,457 | A | 11/1992 | Elsenbaumer |
| 5,185,100 | A | 2/1993 | Han et al. |
| 5,247,190 | A | 9/1993 | Friend et al. |
| 5,286,413 | A | 2/1994 | Hannecart et al. |
| 5,300,575 | A | 4/1994 | Jonas et al. |
| 5,317,169 | A | 5/1994 | Nakano et al. |
| 5,378,402 | A | 1/1995 | Cross et al. |
| 5,463,005 | A | 10/1995 | Desmarteau |
| 5,705,888 | A | 1/1998 | Staring et al. |
| 5,798,170 | A | 8/1998 | Zhang et al. |
| 5,986,400 | A | 11/1999 | Staring et al. |

(Continued)

FOREIGN PATENT DOCUMENTS

DE 4 334 390 A1 4/1995

(Continued)

OTHER PUBLICATIONS

U.S. Appl. No. 60/105,662, filed Oct. 25, 1999, Zhen-Yu Yang et al.

(Continued)

*Primary Examiner* — Ramsey Zacharia

(57) ABSTRACT

There is provided a transparent composite conductor. The composite conductor has a first layer that includes a transparent conductive material and a second layer that includes a fluorinated acid polymer.

6 Claims, 1 Drawing Sheet

U.S. PATENT DOCUMENTS

| | | | | |
|---|---|---|---|---|
| 5,994,496 | A | 11/1999 | Van Haare et al. | |
| 6,150,426 | A | 11/2000 | Curtin et al. | |
| 6,210,790 | B1 | 4/2001 | Crivello | |
| 6,303,238 | B1 | 10/2001 | Thompson et al. | |
| 6,319,428 | B1 | 11/2001 | Michot et al. | |
| 6,324,091 | B1 | 11/2001 | Gryko et al. | |
| 6,337,370 | B1 | 1/2002 | Bae et al. | |
| 6,551,725 | B2 | 4/2003 | Raychaudhuri et al. | |
| 6,670,645 | B2 | 12/2003 | Grushin et al. | |
| 6,706,963 | B2 | 3/2004 | Gaudiana et al. | |
| 6,717,358 | B1 | 4/2004 | Liao et al. | |
| 7,112,369 | B2 | 9/2006 | Wang et al. | |
| 7,166,010 | B2 | 1/2007 | Lamansky et al. | |
| 7,189,771 | B2 | 3/2007 | Hsu | |
| 7,244,797 | B2 | 7/2007 | Kurihara | |
| 7,250,461 | B2 | 7/2007 | Hsu et al. | |
| 7,317,047 | B2 | 1/2008 | Hsu | |
| 7,338,620 | B2 | 3/2008 | Hsu et al. | |
| 7,354,532 | B2 | 4/2008 | Hsu et al. | |
| 7,390,438 | B2 | 6/2008 | Hsu et al. | |
| 7,431,866 | B2 | 10/2008 | Hsu et al. | |
| 7,455,793 | B2 | 11/2008 | Hsu et al. | |
| 7,569,158 | B2 | 8/2009 | Waller et al. | |
| 7,749,407 | B2 | 7/2010 | Hsu et al. | |
| 2001/0019782 | A1 | 9/2001 | Igarashi et al. | |
| 2001/0038937 | A1 | 11/2001 | Suzuki et al. | |
| 2003/0020073 | A1 | 1/2003 | Long et al. | |
| 2003/0052310 | A1 | 3/2003 | Michot et al. | |
| 2003/0118829 | A1 | 6/2003 | Hsu | |
| 2004/0009346 | A1 | 1/2004 | Jang et al. | |
| 2004/0102577 | A1 | 5/2004 | Hsu et al. | |
| 2004/0127637 | A1 | 7/2004 | Hsu et al. | |
| 2004/0149952 | A1 | 8/2004 | DePenning et al. | |
| 2004/0149962 | A1 | 8/2004 | Andriessen | |
| 2004/0206942 | A1 | 10/2004 | Hsu | |
| 2004/0217877 | A1 | 11/2004 | Kokonaski et al. | |
| 2004/0222413 | A1 | 11/2004 | Hsu et al. | |
| 2004/0254297 | A1 | 12/2004 | Hsu et al. | |
| 2005/0040374 | A1 | 2/2005 | Chittibabu et al. | |
| 2005/0070654 | A1 | 3/2005 | Hsu | |
| 2005/0205860 | A1 | 9/2005 | Hsu et al. | |
| 2005/0208328 | A1 | 9/2005 | Hsu et al. | |
| 2005/0209388 | A1 | 9/2005 | Hsu et al. | 524/457 |
| 2005/0209392 | A1 | 9/2005 | Luo et al. | |
| 2005/0222333 | A1 | 10/2005 | Hsu | |
| 2005/0224765 | A1 | 10/2005 | Hsu et al. | |
| 2005/0224788 | A1 | 10/2005 | Hsu et al. | |
| 2006/0113510 | A1 | 6/2006 | Luo et al. | |
| 2006/0289843 | A1 | 12/2006 | Hsu et al. | |
| 2006/0292362 | A1 | 12/2006 | Hsu et al. | |
| 2007/0045591 | A1 * | 3/2007 | Hsu et al. | 252/500 |
| 2007/0096082 | A1 | 5/2007 | Gaynor et al. | |
| 2007/0298530 | A1 | 12/2007 | Feehery | |
| 2008/0135809 | A1 | 6/2008 | Hsu | |
| 2008/0213594 | A1 | 9/2008 | Hsu | |
| 2008/0248314 | A1 | 10/2008 | Hsu et al. | |
| 2008/0251768 | A1 | 10/2008 | Hsu et al. | |
| 2008/0258605 | A1 | 10/2008 | Yukinobu | |
| 2008/0283800 | A1 | 11/2008 | Hsu | |
| 2008/0296536 | A1 | 12/2008 | Hsu et al. | |
| 2009/0008609 | A1 | 1/2009 | Yeisley et al. | |

FOREIGN PATENT DOCUMENTS

| | | | |
|---|---|---|---|
| EP | 0 560 721 | A | 9/1993 |
| EP | 0 593 111 | A | 4/1994 |
| EP | 0 440 957 | B1 | 3/1996 |
| EP | 0 817 540 | A2 | 6/1997 |
| EP | 1286569 | A1 | 2/2003 |
| EP | 1371709 | A1 | 12/2003 |
| EP | 1408563 | A2 | 4/2004 |
| EP | 1 026 152 | B1 | 7/2006 |
| EP | 1191614 | B1 | 5/2009 |
| EP | 1191612 | B1 | 9/2009 |
| GB | 2 124 635 | A | 2/1984 |
| JP | 62119237 | A | 5/1987 |
| JP | 01038808 | B | 8/1989 |
| JP | 02249221 | A | 10/1990 |
| JP | 05129162 | A | 5/1993 |
| JP | 11186103 | A | 7/1999 |
| JP | 2003217862 | A | 7/2003 |
| JP | 2003297582 | A | 10/2003 |
| JP | 2004082395 | A | 3/2004 |
| JP | 2006108064 | A | 4/2006 |
| JP | 2006527277 | A | 11/2006 |
| JP | 2007502531 | T | 2/2007 |
| JP | 2007529607 | A | 10/2007 |
| WO | WO 98/31716 | A1 | 7/1998 |
| WO | WO 99/52954 | A1 | 10/1999 |
| WO | WO 00/70655 | A2 | 11/2000 |
| WO | WO 01/41512 | A1 | 6/2001 |
| WO | 0202714 | A2 | 1/2002 |
| WO | 0215645 | A1 | 2/2002 |
| WO | 02065484 | A1 | 8/2002 |
| WO | 03006515 | A1 | 1/2003 |
| WO | WO 03/006537 | A1 | 1/2003 |
| WO | WO 03/008424 | A1 | 1/2003 |
| WO | WO 03/040257 | A1 | 5/2003 |
| WO | 03046540 | A1 | 6/2003 |
| WO | WO 03/063555 | A1 | 7/2003 |
| WO | 03074601 | A2 | 9/2003 |
| WO | WO 03/091688 | A2 | 11/2003 |
| WO | WO 2004/016710 | A1 | 2/2004 |
| WO | 2004029133 | A1 | 4/2004 |
| WO | 2004029176 | A1 | 4/2004 |
| WO | WO 2004 094501 | A | 4/2004 |
| WO | WO 2004 029128 | A | 8/2004 |
| WO | 2004094501 | A2 | 11/2004 |
| WO | WO 2004 020444 | A | 11/2004 |
| WO | 2004105150 | A1 | 12/2004 |
| WO | 2005003083 | A1 | 1/2005 |
| WO | 2005018012 | A1 | 2/2005 |
| WO | 2005024853 | A1 | 3/2005 |
| WO | 2005041217 | A1 | 5/2005 |
| WO | 2005080525 | A2 | 9/2005 |
| WO | 2005121217 | A1 | 12/2005 |
| WO | 2006073968 | A2 | 7/2006 |
| WO | 2007002682 | A2 | 1/2007 |
| WO | 2007002737 | A2 | 1/2007 |
| WO | 2007092296 | A2 | 8/2007 |
| WO | 2007120143 | A1 | 10/2007 |

OTHER PUBLICATIONS

U.S. Appl. No. 60/176,881, filed Jan. 9, 2000, Jose Manuel Rodriquez-Parada.

A. Feiring et al., Aromatic Monomers With Pendant Fluoroalkylsulfonate and Sulfonimide Groups, Journal of Fluorine Chemistry, 2000, vol. 105:129-135.

A. Feiring et al., Novel Aromatic Polymers With Pendant Lithium Perfluoroalkysulfonate or Sulfonimide Groups, Macromolecules, 2000, vol. 33:9262-9271.

D.D. Desmarteau, Novel Perfluorinated Ionomers and Ionenes, J. Fluorine Chem., 1995, vol. 72:203-208.

A.J. Appleby et al., Polymeric Perfluoro Bis-Sulfonimides as Possible Fuel Cell Electrolytes, J. Electrochem. Soc., 1993, vol. 140:109-111.

Wang, Photoconductive Polymers, Kirk-Othmer Encyclopedia of Chemical Technology, 4th Edition, 1996, vol. 18:837-860.

Notification of Transmittal of the International Search Report and the Written Opinion of the International Searching Authority, PCT/US07/02858, Apr. 7, 2008.

Kyunghoon Lee et al., Poly(Thieno[3,4-b]Thiophene). A New Stable Low Band Gap Conducting Polymer, Macromolecules, 2001, vol. 34:5746-5747.

Gregory A. Sotzing et al., Poly(Thieno[3,4-b]Thiophene): A p- and n-Dopable Polythiophene Exhibiting High Optical Transparency in the Semiconducting State, Macromolecules, 2002, vol. 35:7281-7286.

G. Gustafsson et al., Flexible Light-Emitting Diodes Made From Soluble Conducting Polymers, Nature, 1992, vol. 357:477-479.

Hsu, C. -H., Novel Preparation and Properties of Conductive Polyaniline/Nafion® Film, Synthetic Metals, 1991, 671-674, 41-43 Elsevier Sequioa, The Netherlands.

A. J. Sharpe, Jr. et al., Improved Cationic Conductive Polymer, Calgon Corp., Pittsburgh, PA, Coating Conference [Proceedings], pp. 83-87, 1981, ISSN 0364-2771.
Kim, J. Y et. al., Enhancement of Electrical Conductivity of Poly(3,4-Ethylenedioxythiophene)/Poly(4-Styrenesulfonate) by Change of Solvents, Syntheic Metals, Elsevier Sequoia, Lausanne, CH, vol. 126, No. 2/3 Feb. 2002, pp. 311-316.
International Search Report, European Patent Office, Rijswijk NL, in PCT/US2005/008764 PCT application of 10/803,114, F Rousseau, Authorized Officer, Jul. 27, 2005.
Arnautov et al., New Dopant-Solvent System for Conductive PAN Films Production, Synthetic Metals, 1997, vol. 84, No. 1-3, pp. 133-134, Elsevier Science S.A.
Baytron H. C. Stark GMBH (Brochure) No Date.
Brown et al, "Built-in field electroabsorbtion spectroscopy of plymer light-emitting diodes incorporating a doped poly (3,4-ethylene dioxythiophene) hole injection layer," Applied Physics Letters, AIP, American Institute of Physics, vol. 75, No. 12, Sep. 20, 1999, pp. 1679-1681.
Cen et al., 1,1,2,2-Tetrafluoro-2-(polyfluoroalkoxy)ethanesulfonic Acids, 1,1,2,2-Tetrafluoro-2-(perfluoroalkoxy) ethanesulfonic Acids, and 2,2'-Oxybis(1,1,2,2-tetrafluoroethanesulfonic acid), Inorganic Chemistry, 1988, vol. 27, pp. 1376-1377, American Chemical Society.
Database CA [Online] Chemical Abstracts Service, Columbus, OH, US; Jan. 9, 1988, Iwata, Kaoru et al: "Dopants for electrically conductive polymers" XP002335513 retrieved from STN Database accession No. 1988:7040 abstract.
Database CA [Online] Chemical Abstracts Service, Morimoto, Takeshi et al: "Solid Electrolytic Capacitor having Electrically Conductive Plymer on Dielectric Oxide Film" Database Accession No. 1991:113460, American Chemical Society, Columbus, OH, Oct. 5, 1990.
Downs C et al: "Efficient Polymerization of Aniline at Carbon Nanotube Electrodes", Advanced Materials, vol. 11, No. 12, Jan. 1, 1999, pp. 1028-1031.
Fowler J D et al: "Hydrogen detection by Polyaniline nanofibers on gold and platinum electrodes", The Journal of Physical Chemistry C, vol. 113, No. 16, Sep. 4, 2001, pp. 6444-6449.
Hirai et al; "Electrochemical Behaviors of Polypyrrole, Poly-3-Methyl-thiophene, and Polyaniline Deposited on Nafion-Coated Electrodes," Journal of the Electrochemical Society, vol. 135, No. 5, May 1, 1988, pp. 1132-1137, Electrochemical Society, Manchester, NH.
Iijima et al.—Single-Shell Carbon Nanotubes of 1-nm Diameter, Nature, 1993 vol. 363 pp. 603-605.
Ivanov et al, The Study of Carbon Nanotubules Produced by Catalytic Method, Chem. Phys. Lett. 1994, vol. 223 pp. 329-335.
Journet et al.,—Large-Scale Production of Single-Walled Carbon Nanotubes by the Electric-Arc Technique, Nature, 1997 vol. 388 pp. 756-758.
Kitani et al; "Properties of Elastic Polyaniline," Synthetic Metals, vol. 84, No. 1-3, 1997, pp. 83-84, Elsevier Science S.A.
Li et al—Large-Scale Synthesis of Aligned Carbon Nanotubes, Science, 1996 vol. 274 pp. 1701-1703.
Thess et al., Crystalline Ropes of Metallic Carbon Nanotubes, Science, 1996 vol. 273 pp. 483-487.
Wu et al, Transparent, Conductive Carbon Nanotube Files, Science, 2004, vol. 305, pp. 1273-1276.
Yang S-M et al: "The photoelectrochemical properties of TiO2 electrodes modified by quantum sized PbS and thiols", Synthetic Metals, vol. 123, No. 2, Sep. 4, 2001, pp. 267-272.
Yuan Y F et al: "Size and morphology effects of ZnO anode nanomaterials for Zn/Ni secondary batteries; Size and morphology effects of ZnO anode nanomaterials for Zn/Ni secondary batteries", Nanotechnology, vol. 16, No. 6, Jun. 1, 2005, pp. 803-808.
EESR Jun. 30, 2009; Extended European Search Report for Application No. EP 06785720.0.
EESR Nov. 19, 2010; Extended European Search Report, EP 07763641.3.
EESR Jun. 21, 2011; Extended European Search Report for Application No. EP 06 774 171.
IPER Dec. 28, 2007; Written Opinion of the International Search Authority; PCT/US2006/25128; Dec. 28, 2007.
ISR Aug. 2, 2005; PCT International Search Report for International Application No. PCT/US2005012460; Apr. 12, 2005.
ISR Feb. 1, 2007; PCT International Search Report for Application No. PCT/US2006/014551; Feb. 1, 2007.
ISR Feb. 6, 2008; PCT International Search Report for International Application No. PCT/US06/25129; Feb. 6, 2008.
ISR Feb. 18, 2009; PCT International Search Report for International Application No. PCT/US08/88089; Feb. 18, 2009.
EESR Sep. 23, 2011; Extended European Searhc Report for Application No. 11006587.7.
EESR Oct. 12, 2011; Extended European Search Report for Application No. 11006586.9.
EPO Official Action; 20111017; EP0763641.3.

* cited by examiner

TRANSPARENT COMPOSITE CONDUCTORS HAVING HIGH WORK FUNCTION

CROSS REFERENCE TO RELATED APPLICATIONS

This application claims the benefit of priority under 35 U.S.C. §1.19(e) from provisional U.S. Application No. 60/765,031, "Transparent Composite Conductors Having High Work Function," Hsu, et al., filed Feb. 3, 2006, which is incorporated by reference herein in its entirety.

BACKGROUND INFORMATION

1. Field of the Disclosure

This disclosure relates in general to transparent conductors, and to electronic devices containing such transparent conductors.

2. Description of the Related Art

Transparent conductors which have been used in the past include indium-tin oxide ("ITO"), indium-zinc oxide ("IZO"), silver, and carbon nanotubes. In general, these conductors have a work function that is below 5.0 eV. In electronic devices, there is a need for transparent conductors that have a higher work function.

SUMMARY

There is provided a composite conductor having a work function greater than 5.0 eV. The composite conductor comprises a first layer comprising a transparent conductive material having a work function less than 5.0 eV, and a second layer comprising a fluoropolymeric acid or a fluorinated polysulfonimide.

Also described is a composite conductor having a work function greater than 5.2 eV.

There is also provided an electronic device containing the above transparent composite conductor.

The foregoing general description and the following detailed description are exemplary and explanatory, and are not restrictive of the invention as defined in the appended claims.

BRIEF DESCRIPTION OF THE DRAWINGS

Embodiments are illustrated in the accompanying figures to improve understanding of concepts as presented herein.

Figure 1:
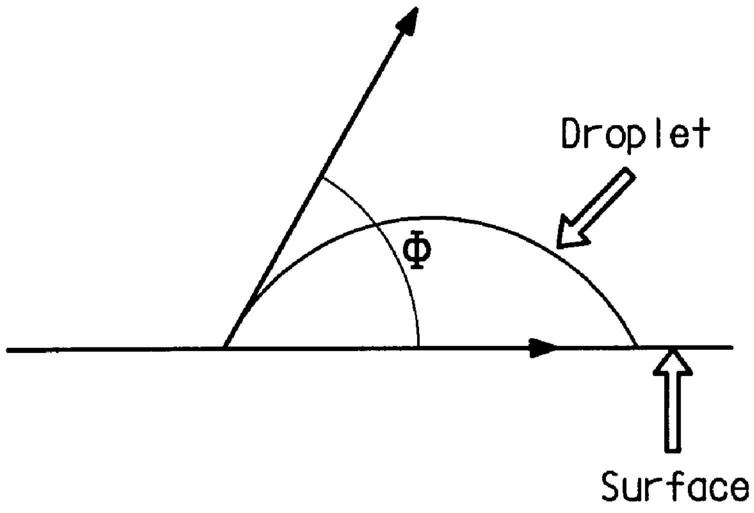
FIG. 1 is a diagram illustrating contact angle.

Skilled artisans will appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

There is provided a composite conductor having a work function greater than 5.0 eV. The composite conductor comprises a first layer comprising a transparent conductive material, and a second layer comprising a fluorinated acid polymer.

In one embodiment, the first layer has a work function less than 5.0 eV.

In one embodiment, the first layer has a thickness that is greater than the thickness of the second layer.

In one embodiment, the second layer has a thickness less than 100 nm. In one embodiment, the thickness is less than 10 nm.

There is also provided an electronic device containing the above transparent composite conductor.

Many aspects and embodiments are described herein and are merely exemplary and not limiting. After reading this specification, skilled artisans will appreciate that other aspects and embodiments are possible without departing from the scope of the invention.

Other features and benefits of any one or more of the embodiments will be apparent from the following detailed description, and from the claims. The detailed description first addresses Definitions and Clarification of Terms followed by Transparent Conductive Material, Fluorinated Acid Polymers, Methods of Making Composite Conductors, Organic Electronic Devices, and finally Examples.

1. Definitions and Clarification of Terms

Before addressing details of embodiments described below, some terms are defined or clarified.

The term "conductor" and its variants are intended to mean a layer material, member, or structure having an electrical property such that current flows through such layer material, member, or structure without a substantial drop in potential. The term is intended to include semiconductors. In one embodiment, a conductor will form a layer having a conductivity of at least $10^{-6}$ S/cm.

The term "work function" is intended to mean the minimum energy needed to remove an electron from a material to a point at infinite distance away from the surface.

The term "fluorinated acid polymer" refers to a polymer having acidic groups, where at least one hydrogen bonded to a carbon has been replaced with a fluorine. The term includes perfluorinated compounds in which all C—H hydrogens are replaced with fluorine. The term "acidic group" refers to a group capable of ionizing to donate a hydrogen ion to a Brønsted base to form a salt.

The term "fluoropolysulfonimide" refers to a polymer having multiple sulfonimide groups and in which at least one hydrogen bonded to a carbon has been replaced with a fluorine. The term includes perfluorinated compounds in which all C—H hydrogens are replaced with fluorine.

The term "transparent" is intended to mean that, at the thickness used, a material transmits at least 50% of incident light in the range of 400-700 nm. In one embodiment, the material transmits at least 80% of incident light. It is understood that a material may be transparent at one thickness, and not transparent and a greater thickness.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics*, $81^{st}$ Edition (2000-2001).

Unless otherwise defined, all technical and scientific terms used herein have the same meaning as commonly understood by one of ordinary skill in the art to which this disclosure belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the organic light-emitting diode display, photodetector, photovoltaic, and semiconductive member arts.

2. Transparent Conductors

The first layer in the composite conductor comprises a transparent conductive material. In one embodiment, the first layer has a work function less than 5.0 eV. The conductive material can be a metal, mixed metal, alloy, metal oxide, mixed oxide, conductive polymer or carbon nanotubes.

In one embodiment, the conductive material is selected from mixed oxides of Groups 12, 13 and 14 elements. As used herein, the phrase "mixed oxide" refers to oxides having two or more different cations selected from the Group 2 elements or the Groups 12, 13, or 14 elements. Some non-limiting, specific examples of conductive mixed oxides include, but are not limited to, indium-tin-oxide ("ITO"), indium-zinc-oxide, aluminum-tin-oxide, and antimony-tin-oxide. In one embodiment, the conductive material is ITO.

In one embodiment, the conductive material is a metal. The metal layer will be thin enough to be transparent, as defined herein. In one embodiment, the metal is gold, silver, copper, or nickel. In one embodiment, the metal is silver.

In one embodiment, the conductive material is a conductive polymer. Some non-limiting, specific example of conductive polymers include homopolymers and copolymers of thiophenes, pyrroles, anilines, and polycyclic aromatics, which may be substituted or unsubstituted. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring.

3. Fluorinated Acid Polymers

The fluorinated acid polymer can be any polymer which is fluorinated and has acidic groups with acidic protons. The term includes partially and fully fluorinated materials. In one embodiment, the fluorinated acid polymer is highly fluorinated. The term "highly fluorinated" means that at least 50% of the available hydrogens bonded to a carbon, have been replaced with fluorine. The acidic groups supply an ionizable proton. In one embodiment, the acidic proton has a pKa of less than 3. In one embodiment, the acidic proton has a pKa of less than 0. In one embodiment, the acidic proton has a pKa of less than −5. The acidic group can be attached directly to the polymer backbone, or it can be attached to side chains on the polymer backbone. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group.

In one embodiment, the fluorinated acid polymer is water-soluble. In one embodiment, the fluorinated acid polymer is dispersible in water.

In one embodiment, the fluorinated acid polymer is organic solvent wettable. The term "organic solvent wettable" refers to a material which, when formed into a film, is wettable by organic solvents. In one embodiment, wettable materials form films which are wettable by phenylhexane with a contact angle no greater than 40°. As used herein, the term "contact angle" is intended to mean the angle ϕ shown in FIG. 1. For a droplet of liquid medium, angle ϕ is defined by the intersection of the plane of the surface and a line from the outer edge of the droplet to the surface. Furthermore, angle ϕ is measured after the droplet has reached an equilibrium position on the surface after being applied, i.e. "static contact angle". The film of the organic solvent wettable fluorinated polymeric acid is represented as the surface. In one embodiment, the contact angle is no greater than 35°. In one embodiment, the contact angle is no greater than 30°. The methods for measuring contact angles are well known.

In one embodiment, the polymer backbone is fluorinated. Examples of suitable polymeric backbones include, but are not limited to, polyolefins, polyacrylates, polymethacrylates, polyimides, polyamides, polyaramids, polyacrylamides, polystyrenes, and copolymers thereof. In one embodiment, the polymer backbone is highly fluorinated. In one embodiment, the polymer backbone is fully fluorinated.

In one embodiment, the acidic groups are sulfonic acid groups or sulfonimide groups. A sulfonimide group has the formula:

$$—SO_2—NH—SO_2—R$$

where R is an alkyl group.

In one embodiment, the acidic groups are on a fluorinated side chain. In one embodiment, the fluorinated side chains are selected from alkyl groups, alkoxy groups, amido groups, ether groups, and combinations thereof.

In one embodiment, the fluorinated acid polymer has a fluorinated olefin backbone, with pendant fluorinated ether sulfonate, fluorinated ester sulfonate, or fluorinated ether sulfonimide groups. In one embodiment, the polymer is a copolymer of 1,1-difluoroethylene and 2-(1,1-difluoro-2-(trifluoromethyl)allyloxy)-1,1,2,2-tetrafluoroethanesulfonic acid. In one embodiment, the polymer is a copolymer of ethylene and 2-(2-(1,2,2-trifluorovinyloxy)-1,1,2,3,3,3-hexafluoropropoxy)-1,1,2,2-tetrafluoroethanesulfonic acid. These copolymers can be made as the corresponding sulfonyl fluoride polymer and then can be converted to the sulfonic acid form.

In one embodiment, the fluorinated acid polymer is a homopolymer or copolymer of a fluorinated and partially sulfonated poly(arylene ether sulfone). The copolymer can be a block copolymer. Examples of comonomers include, but are not limited to butadiene, butylene, isobutylene, styrene, and combinations thereof.

In one embodiment, the fluorinated acid polymer is a homopolymer or copolymer of monomers having Formula VII:

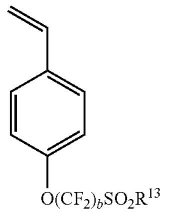

(VII)

where:

b is an integer from 1 to 5, $R^{13}$ is OH or $NHR^{14}$, and $R^{14}$ is alkyl, fluoroalkyl, sulfonylalkyl, or sulfonylfluoroalkyl.

In one embodiment, the monomer is "SFS" or SFSI" shown below:

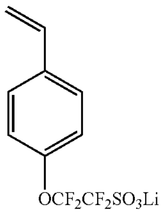

SFS

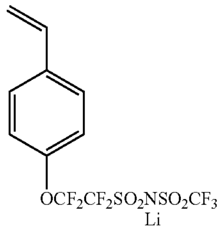

SFSI

After polymerization, the polymer can be converted to the acid form.

In one embodiment, the fluorinated acid polymer is a homopolymer or copolymer of a trifluorostyrene having acidic groups. In one embodiment, the trifluorostyrene monomer has Formula VIII:

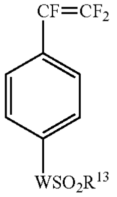

(VIII)

where:

W is selected from $(CF_2)_b$, $O(CF_2)_b$, $S(CF_2)_b$, $(CF_2)_bO(CF_2)_b$, b is independently an integer from 1 to 5, $R^{13}$ is OH or $NHR^{14}$, and $R^{14}$ is alkyl, fluoroalkyl, sulfonylalkyl, or sulfonylfluoroalkyl.

In one embodiment, the monomer containing W equal to $S(CF_2)_q$ is polymerized then oxidized to give the polymer containing W equal to $SO_2(CF_2)_q$. In one embodiment, the polymer containing $R^{13}$ equal to F is converted its acid form where $R^{13}$ is equal to OH or $NHR^{14}$.

In one embodiment, the fluorinated acid polymer is a sulfonimide polymer having Formula IX:

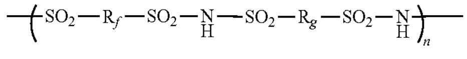

(IX)

where:

$R_f$ is selected from fluorinated alkylene, fluorinated heteroalkylene, fluorinated arylene, or fluorinated heteroarylene;

$R_g$ is selected from fluorinated alkylene, fluorinated heteroalkylene, fluorinated arylene, fluorinated heteroarylene, arylene, or heteroarylene; and n is at least 4.

In one embodiment of Formula IX, $R_f$ and $R_g$ are perfluoroalkylene groups. In one embodiment, $R_f$ and $R_g$ are perfluorobutylene groups. In one embodiment, $R_f$ and $R_g$ contain ether oxygens. In one embodiment, n is greater than 20.

In one embodiment, the fluorinated acid polymer comprises a fluorinated polymer backbone and a side chain having Formula X:

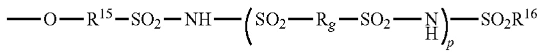

(X)

where:

$R^{15}$ is a fluorinated alkylene group or a fluorinated heteroalkylene group;

$R^{16}$ is a fluorinated alkyl or a fluorinated aryl group;

$R_g$ is selected from fluorinated alkylene, fluorinated heteroalkylene, fluorinated arylene, fluorinated heteroarylene, arylene, or heteroarylene; and a is 0 or an integer from 1 to 4.

In one embodiment, the fluorinated acid polymer has Formula XI:

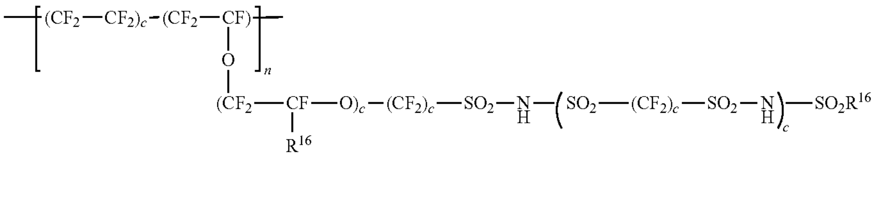

(XI)

where:

$R^{16}$ is a fluorinated alkyl or a fluorinated aryl group;

c is the same or different at each occurrence and is independently 0 or an integer from 1 to 4; and n is at least 4.

The synthesis of fluorinated acid polymers has been described in, for example, A. Feiring et al., J. Fluorine Chemistry 2000, 105, 129-135; A. Feiring et al., Macromolecules 2000, 33, 9262-9271; D. D. Desmarteau, J. Fluorine Chem. 1995, 72, 203-208; A. J. Appleby et al., J. Electrochem. Soc. 1993, 140(1), 109-111; and Desmarteau, U.S. Pat. No. 5,463, 005.

In one embodiment, the fluorinated acid polymer comprises at least one repeat unit derived from an ethylenically unsaturated compound having the structure (XII):

(XII)

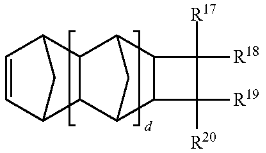

wherein d is 0, 1, or 2;

$R^{17}$ to $R^{20}$ are independently H, halogen, alkyl or alkoxy of 1 to 10 carbon atoms, Y, $C(R_f')(R_f')OR^{21}$, $R^4Y$ or $OR^4Y$;

Y is $COE^2$, $SO_2E^2$, or sulfonimide;

$R^{21}$ is hydrogen or an acid-labile protecting group;

$R_f'$ is the same or different at each occurrence and is a fluoroalkyl group of 1 to 10 carbon atoms, or taken together are $(CF_2)_e$ where e is 2 to 10;

$R^4$ is an alkylene group;

$E^2$ is OH, halogen, or $OR^7$; and $R^5$ is an alkyl group;

with the proviso that at least one of $R^{17}$ to $R^{20}$ is Y, $R^4Y$ or $OR^4Y$, and $R^4$, $R^5$, and $R^{17}$ to $R^{20}$ may optionally be substituted by halogen or ether oxygen.

Some illustrative, but nonlimiting, examples of representative monomers of structure (XII) and within the scope of the invention are presented below:

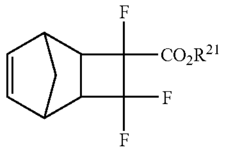
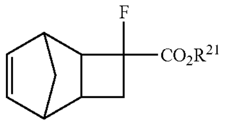
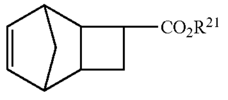
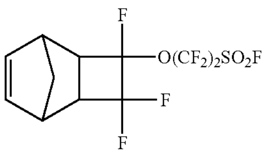
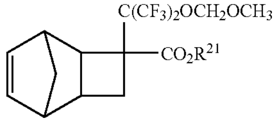

wherein $R^{21}$ is a group capable of forming or rearranging to a tertiary cation, more typically an alkyl group of 1 to 20 carbon atoms, and most typically t-butyl.

Compounds of structure (XII) wherein d=0, structure (XII-a), may be prepared by cycloaddition reaction of unsaturated compounds of structure (XIII) with quadricyclane (tetracyclo $[2.2.1.0^{2,6}0^{3,5}]$heptane) as shown in the equation below.

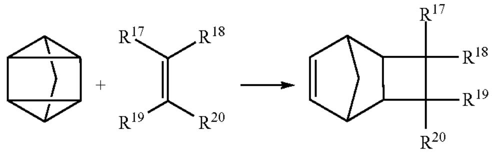

(XIII) (XII-a)

The reaction may be conducted at temperatures ranging from about 0° C. to about 200° C., more typically from about 30° C. to about 150° C. in the absence or presence of an inert solvent such as diethyl ether. For reactions conducted at or above the boiling point of one or more of the reagents or solvent, a closed reactor is typically used to avoid loss of volatile components. Compounds of structure (XII) with higher values of d (i.e., d=1 or 2) may be prepared by reaction of compounds of structure (XII) with d=0 with cyclopentadiene, as is known in the art.

In one embodiment, the fluorinated acid polymer also comprises a repeat unit derived from at least one ethylenically unsaturated compound containing at least one fluorine atom attached to an ethylenically unsaturated carbon. The fluoroolefin comprises 2 to 20 carbon atoms. Representative fluoroolefins include, but are not limited to, tetrafluoroethylene, hexafluoropropylene, chlorotrifluoroethylene, vinylidene fluoride, vinyl fluoride, perfluoro-(2,2-dimethyl-1,3-dioxole), perfluoro-(2-methylene-4-methyl-1,3-dioxolane), $CF_2{=}CFO(CF_2)_tCF{=}CF_2$, where t is 1 or 2, and $R_f''OCF{=}CF_2$ wherein $R_f''$ is a saturated fluoroalkyl group of from 1 to about ten carbon atoms. In one embodiment, the comonomer is tetrafluoroethylene.

In one embodiment, the fluorinated acid polymer is a colloid-forming polymeric acid. As used herein, the term "colloid-forming" refers to materials which are insoluble in water, and form colloids when dispersed into an aqueous medium. The colloid-forming polymeric acids typically have a molecular weight in the range of about 10,000 to about 4,000, 000. In one embodiment, the polymeric acids have a molecular weight of about 100,000 to about 2,000,000. Colloid particle size typically ranges from 2 nanometers (nm) to about 140 nm. In one embodiment, the colloids have a particle size of 2 nm to about 30 nm. Any colloid-forming polymeric material having acidic protons can be used. In one embodiment, the colloid-forming fluorinated polymeric acid has acidic groups selected from carboxylic groups, sulfonic acid groups, and sulfonimide groups. In one embodiment, the colloid-forming fluorinated polymeric acid is a polymeric sulfonic acid. In one embodiment, the colloid-forming polymeric sulfonic acid is perfluorinated. In one embodiment, the colloid-forming polymeric sulfonic acid is a perfluoroalkylenesulfonic acid.

In one embodiment, the fluorinated acid polymer comprises a polymeric backbone having pendant groups comprising siloxane sulfonic acid. In one embodiment, the siloxane pendant groups have the formula below:

$$-O_aSi(OH)_{b-a}R^{22}_{3-b}R^{23}R_fSO_3H$$

wherein:

a is from 1 to b;

b is from 1 to 3;

$R^{22}$ is a non-hydrolyzable group independently selected from the group consisting of alkyl, aryl, and arylalkyl;

$R^{23}$ is a bidentate alkylene radical, which may be substituted by one or more ether oxygen atoms, with the proviso that $R^{23}$ has at least two carbon atoms linearly disposed between Si and $R_f$; and $R_f$ is a perfluoralkylene radical, which may be substituted by one or more ether oxygen atoms.

In one embodiment, the fluorinated acid polymer having pendant siloxane groups has a fluorinated backbone. In one embodiment, the backbone is perfluorinated.

In one embodiment, the fluorinated acid polymer has a fluorinated backbone and pendant groups represented by the Formula (XIV)

$$—O_g—[CF(R_f^2)CF—O_h]_i—CF_2CF_2SO_3H \quad (XIV)$$

wherein $R_f^2$ is F or a perfluoroalkyl radical having 1-10 carbon atoms either unsubstituted or substituted by one or more ether oxygen atoms, h=0 or 1, i=0 to 3, and g=0 or 1.

In one embodiment, the fluorinated acid polymer has formula (XV)

$$—(CF_2CF_2)_j(CH_2CQ^1_2)_k(CQ^2_2CQ^2)— \quad (XV)$$
$$|$$
$$O_g—[CF(R_f^2)CF_2—O_h]_i—CF_2CF_2SO_3H$$

where $j \geqq 0$, $k \geqq 0$ and $4 \leqq (j+k) \leqq 199$, $Q^1$ and $Q^2$ are F or H, $R_f^2$ is F or a perfluoroalkyl radical having 1-10 carbon atoms either unsubstituted or substituted by one or more ether oxygen atoms, h=0 or 1, i=0 to 3, g=0 or 1, and $E^4$ is H or an alkali metal. In one embodiment $R_f^2$ is $—CF_3$, g=1, h=1, and i=1. In one embodiment the pendant group is present at a concentration of 3-10 mol-%.

In one embodiment, $Q^1$ is H, $k \geqq 0$, and $Q^2$ is F, which may be synthesized according to the teachings of Connolly et al., U.S. Pat. No. 3,282,875. In another preferred embodiment, $Q^1$ is H, $Q^2$ is H, g=0, $R_f^2$ is F, h=1, and i–1, which may be synthesized according to the teachings of U.S. application Ser. No. 60/105,662. Still other embodiments may be synthesized according to the various teachings in Drysdale et al., WO 9831716(A1), and co-pending US applications Choi et al, WO 99/52954(A1), and 60/176,881.

In one embodiment, the colloid-forming polymeric acid is a highly-fluorinated sulfonic acid polymer ("FSA polymer"). "Highly fluorinated" means that at least about 50% of the total number of halogen and hydrogen atoms in the polymer are fluorine atoms, an in one embodiment at least about 75%, and in another embodiment at least about 90%. In one embodiment, the polymer is perfluorinated. The term "sulfonate functional group" refers to either to sulfonic acid groups or salts of sulfonic acid groups, and in one embodiment alkali metal or ammonium salts. The functional group is represented by the formula $—SO_3E^5$ where $E^5$ is a cation, also known as a "counterion". $E^5$ may be H, Li, Na, K or $N(R_1)(R_2)(R_3)(R_4)$, and $R_1$, $R_2$, $R_3$, and $R_4$ are the same or different and are and in one embodiment H, $CH_3$ or $C_2H_5$. In another embodiment, $E^5$ is H, in which case the polymer is said to be in the "acid form". $E^5$ may also be multivalent, as represented by such ions as $Ca^{++}$, and $Al^{+++}$. It is clear to the skilled artisan that in the case of multivalent counterions, represented generally as $M^{x+}$, the number of sulfonate functional groups per counterion will be equal to the valence "x".

In one embodiment, the FSA polymer comprises a polymer backbone with recurring side chains attached to the backbone, the side chains carrying cation exchange groups. Polymers include homopolymers or copolymers of two or more monomers. Copolymers are typically formed from a nonfunctional monomer and a second monomer carrying the cation exchange group or its precursor, e.g., a sulfonyl fluoride group ($—SO_2F$), which can be subsequently hydrolyzed to a sulfonate functional group. For example, copolymers of a first fluorinated vinyl monomer together with a second fluorinated vinyl monomer having a sulfonyl fluoride group ($—SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro(alkyl vinyl ether), and combinations thereof. TFE is a preferred first monomer.

In other embodiments, possible second monomers include fluorinated vinyl ethers with sulfonate functional groups or precursor groups which can provide the desired side chain in the polymer. Additional monomers, including ethylene, propylene, and $R—CH{=}CH_2$ where R is a perfluorinated alkyl group of 1 to 10 carbon atoms, can be incorporated into these polymers if desired. The polymers may be of the type referred to herein as random copolymers, that is copolymers made by polymerization in which the relative concentrations of the comonomers are kept as constant as possible, so that the distribution of the monomer units along the polymer chain is in accordance with their relative concentrations and relative reactivities. Less random copolymers, made by varying relative concentrations of monomers in the course of the polymerization, may also be used. Polymers of the type called block copolymers, such as that disclosed in European Patent Application No. 1 026 152 A1, may also be used.

In one embodiment, FSA polymers for use in the present invention include a highly fluorinated, and in one embodiment perfluorinated, carbon backbone and side chains represented by the formula $$—(O—CF_2CFR_f^3)_a—O—CF_2CFR_f^4SO_3E^5$$

wherein $R_f^3$ and $R_f^4$ are independently selected from F, Cl or a perfluorinated alkyl group having 1 to 10 carbon atoms, a=0, 1 or 2, and $E^5$ is H, Li, Na, K or N(R1)(R2)(R3)(R4) and R1, R2, R3, and R4 are the same or different and are and in one embodiment H, $CH_3$ or $C_2H_5$. In another embodiment $E^5$ is H. As stated above, $E^5$ may also be multivalent.

In one embodiment, the FSA polymers include, for example, polymers disclosed in U.S. Pat. No. 3,282,875 and in U.S. Pat. Nos. 4,358,545 and 4,940,525. An example of preferred FSA polymer comprises a perfluorocarbon backbone and the side chain represented by the formula $$—O—CF_2CF(CF_3)—O—CF_2CF_2SO_3E^5$$

where $E^5$ is as defined above. FSA polymers of this type are disclosed in U.S. Pat. No. 3,282,875 and can be made by copolymerization of tetrafluoroethylene (TFE) and the perfluorinated vinyl ether $CF_2{=}CF—O—CF_2CF(CF_3)—O—CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a polymer of the type disclosed in U.S. Pat. Nos. 4,358,545 and 4,940,525 has the side chain $—O—CF_2CF_2SO_3E^5$, wherein $E^5$ is as defined above. This polymer can be made by copolymerization of tetrafluoroethylene (TFE) and the perfluorinated vinyl ether $CF_2{=}CF—O—CF_2CF_2SO_2F$, perfluoro(3-oxa-4-pentenesulfonyl fluoride) (POPF), followed by hydrolysis and further ion exchange as necessary.

In one embodiment, the FSA polymers for use in this invention typically have an ion exchange ratio of less than about 33. In this application, "ion exchange ratio" or "IXR" is defined as number of carbon atoms in the polymer backbone in relation to the cation exchange groups. Within the range of less than about 33, IXR can be varied as desired for the particular application. In one embodiment, the IXR is about 3 to about 33, and in another embodiment about 8 to about 23.

The cation exchange capacity of a polymer is often expressed in terms of equivalent weight (EW). For the purposes of this application, equivalent weight (EW) is defined to be the weight of the polymer in acid form required to neutralize one equivalent of sodium hydroxide. In the case of a sulfonate polymer where the polymer has a perfluorocarbon backbone and the side chain is —O—$CF_2$—$CF(CF_3)$—O—$CF_2$—$CF_2$—$SO_3H$ (or a salt thereof, the equivalent weight range which corresponds to an IXR of about 8 to about 23 is about 750 EW to about 1500 EW. IXR for this polymer can be related to equivalent weight using the formula: 50 IXR+344=EW. While the same IXR range is used for sulfonate polymers disclosed in U.S. Pat. Nos. 4,358,545 and 4,940,525, e.g., the polymer having the side chain —O—$CF_2CF_2SO_3H$ (or a salt thereof), the equivalent weight is somewhat lower because of the lower molecular weight of the monomer unit containing a cation exchange group. For the preferred IXR range of about 8 to about 23, the corresponding equivalent weight range is about 575 EW to about 1325 EW. IXR for this polymer can be related to equivalent weight using the formula: 50 IXR+178=EW.

The FSA polymers can be prepared as colloidal aqueous dispersions. They may also be in the form of dispersions in other media, examples of which include, but are not limited to, alcohol, water-soluble ethers, such as tetrahydrofuran, mixtures of water-soluble ethers, and combinations thereof. In making the dispersions, the polymer can be used in acid form. U.S. Pat. Nos. 4,433,082, 6,150,426 and WO 03/006537 disclose methods for making of aqueous alcoholic dispersions. After the dispersion is made, concentration and the dispersing liquid composition can be adjusted by methods known in the art.

Aqueous dispersions of the colloid-forming polymeric acids, including FSA polymers, typically have particle sizes as small as possible and an EW as small as possible, so long as a stable colloid is formed.

Aqueous dispersions of FSA polymer are available commericially as Nafion® dispersions, from E.I. du Pont de Nemours and Company (Wilmington, Del.).

4. Methods of Making Composite Conductors

The first and second layers of the composite conductor can be made using any technique for forming layers. In one embodiment, the first layer is formed first, and the second layer is formed directly on at least a part of the first layer. In one embodiment, the second layer is formed directly on and covering the entire first layer. In one embodiment, the second layer is formed first, and the first layer is formed directly on at least a part of the second layer.

In one embodiment, the first layer is formed by vapor deposition onto a substrate. Any vapor deposition technique can be used, including sputtering, thermal evaporation, chemical vapor deposition and the like. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include rf magnetron sputtering and inductively-coupled plasma physical vapor deposition ("IMP-PVD"). These deposition techniques are well known within the semiconductor fabrication arts. In one embodiment, the first layer comprises a conductive metal, metal oxide, or mixed oxide and is formed by vapor deposition.

In one embodiment, the first layer comprises a conductive polymer and is formed on a substrate by liquid deposition from a liquid composition. The term "liquid composition" is intended to mean a a liquid medium in which a material is dissolved to form a solution, a liquid medium in which a material is dispersed to form a dispersion, or a liquid medium in which a material is suspended to form a suspension or an emulsion. The term "liquid medium" is intended to mean a liquid material, including a pure liquid, a combination of liquids, a solution, a dispersion, a suspension, and an emulsion. Liquid medium is used regardless whether one or more solvents are present. In one embodiment, the liquid medium is a solvent or combination of two or more solvents. Any solvent or combination of solvents can be used so long as a layer of the conductive polymer can be formed. The liquid medium may include other materials, such as coating aids.

Continuous liquid deposition techniques, include but are not limited to, spin coating, gravure coating, curtain coating, dip coating, slot-die coating, spray coating, and continuous nozzle coating. Discontinuous liquid deposition techniques include, but are not limited to, ink jet printing, gravure printing, flexographic printing and screen printing.

In one embodiment, the first layer comprises carbon nanotubes and is formed by liquid deposition from a liquid composition.

The term "substrate" is intended to mean a base material that can be either rigid or flexible and may be include one or more layers of one or more materials. Substrate materials can include, but are not limited to, glass, polymer, metal or ceramic materials or combinations thereof. The substrate may or may not include electronic components, circuits, conductive members, or layers of other materials.

In one embodiment, the second layer is formed directly on at least a part of the first layer by liquid deposition from a liquid composition. In one embodiment, the liquid composition is a solution of a water soluble fluorinated acid polymer.

The thickness of the first layer can be as great as desired for the intended use. In one embodiment, the first layer is a free-standing layer and is not on a substrate. In one embodiment, the first layer has a thickness in the range of 100 nm to 200 microns. In one embodiment, the first layer has a thickness in the range of 50-500 nm. In one embodiment, the first layer has a thickness that is greater than the thickness of the second layer.

The thickness of the second layer can be a little as a single monolayer. In one embodiment, the thickness is less than 100 nm. In one embodiment, the thickness is less than 10 nm. In one embodiment, the thickness is less than 1 nm.

In one embodiment, the fluorinated acid polymer is partially neutralized prior to depositing on the first layer, in order to raise the pH. Materials having a higher pH may be desired if the material in the first layer is easily corroded by acid.

5. Electronic Devices

In another embodiment of the invention, there are provided electronic devices comprising the composite conductor. In one embodiment, the composite conductor is an electrode.

In one embodiment, the electronic device comprises at least one electroactive layer positioned between two electrical contact layers, wherein one of the electrical contact layers is the new composite conductor. In one embodiment, the new composite conductor is an anode. The term "electroactive" when referring to a layer or material is intended to mean a layer or material that exhibits electronic or electro-radiative properties. An electroactive layer material may emit radiation or exhibit a change in concentration of electron-hole pairs when receiving radiation. In one embodiment, the electronic device is an organic electronic device, wherein the active layers are organic.

Figure 2:
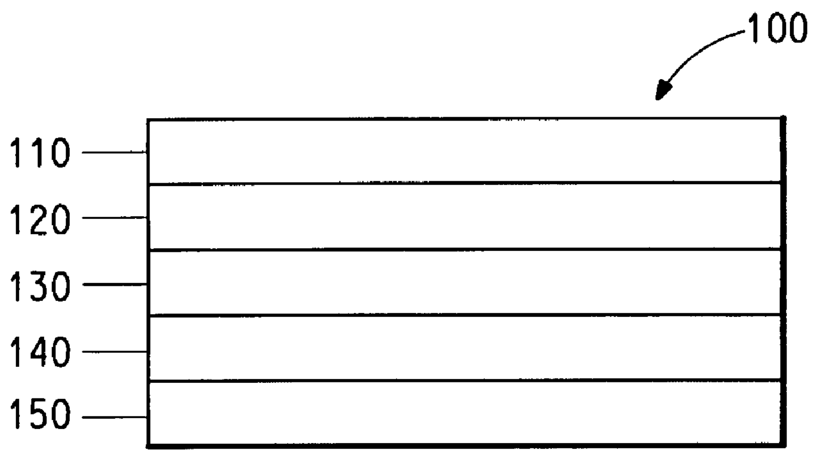
FIG. 2 includes an illustration of an organic electronic device.

One example of an organic electronic device is shown in FIG. 2. The device, 100, has an anode layer 110, a buffer layer 120, an electroactive layer 130, and a cathode layer 150. Adjacent to the cathode layer 150 is an optional electron-injection/transport layer 140.

The device may include a support or substrate (not shown) that can be adjacent to the anode layer 110 or the cathode layer 150. Most frequently, the support is adjacent the anode layer 110. The support can be flexible or rigid, organic or inorganic. Examples of support materials include, but are not limited to, glass, ceramic, metal, and plastic films.

The anode layer 110 is an electrode that is more efficient for injecting holes compared to the cathode layer 150. The anode 110 can be the new transparent composite conductor described herein, having a first layer 111 comprising a transparent conductive material having a work function less than 5.0 eV, and a second layer 112 comprising a fluorinated acid polymer.

The composite conductor 110 may be formed as described herein. In one embodiment, the first layer is formed by a vapor deposition process and the second layer is formed by a liquid deposition process.

In one embodiment, the anode 110 is patterned during a lithographic operation. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used. The anode may be patterned by forming the first layer 111, patterning this layer, and then applying the second layer 112 over the first layer. The second layer 112 may be applied overall, covering both the first layer 111 and the underlying substrate (not shown). Or it may be applied pattern-wise over just the first layer 111. In one embodiment, the first layer 111 is a material selected from the group consisting of indium-tin-oxide ("ITO"), indium-zinc-oxide, aluminum-tin-oxide, and antimony-tin-oxide. In one embodiment, the first layer has a thickness in the range of 50-500 nm. In one embodiment, the second layer 112 is organic solvent wettable. In one embodiment, the second layer is water-soluble. In one embodiment, the second layer has a thickness in the range of 1 to 100 nm.

The term "buffer layer" or "buffer material" is intended to mean electrically conductive or semiconductive materials, and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. Buffer materials may be polymers, oligomers, or small molecules, and may be in the form of solutions, dispersions, suspensions, emulsions, colloidal mixtures, or other compositions. The buffer layer 120 is usually deposited onto substrates using a variety of techniques well-known to those skilled in the art. Typical deposition techniques, as discussed above, include vapor deposition, liquid deposition (continuous and discontinuous techniques), and thermal transfer.

In one embodiment, the buffer layer comprises a hole transport material.

An optional layer, not shown, may be present between the buffer layer 120 and the electroactive layer 130. This layer may comprise hole transport materials. Examples of hole transport materials for the buffer layer and/or layer 120 have been summarized for example, in Kirk-Othmer Encyclopedia of Chemical Technology, Fourth Edition, Vol. 18, p. 837-860, 1996, by Y. Wang. Both hole transporting molecules and polymers can be used. Commonly used hole transporting molecules include, but are not limited to: 4,4',4"-tris(N,N-diphenyl-amino)-triphenylamine (TDATA); 4,4',4"-tris(N-3-methylphenyl-N-phenyl-amino)-triphenylamine (MT-DATA); N,N'-diphenyl-N,N'-bis(3-methylphenyl)-[1,1'-biphenyl]-4,4'-diamine (TPD); 1,1-bis[(di-4-tolylamino)phenyl]cyclohexane (TAPC); N,N'-bis(4-methylphenyl)-N,N'-bis(4-ethylphenyl)-[1,1'-(3,3'-dimethyl)biphenyl]-4,4'-diamine (ETPD); tetrakis-(3-methylphenyl)-N, N,N',N'-2,5-phenylenediamine (PDA); α-phenyl-4-N,N-diphenylaminostyrene (TPS); p-(diethylamino)benzaldehyde diphenylhydrazone (DEH); triphenylamine (TPA); bis[4-(N,N-diethylamino)-2-methylphenyl](4-methylphenyl)methane (MPMP); 1-phenyl-3-[p-(diethylamino)styryl]-5-[p-(diethylamino)phenyl]pyrazoline (PPR or DEASP); 1,2-trans-bis(9H-carbazol-9-yl)cyclobutane (DCZB); N,N,N',N'-tetrakis(4-methylphenyl)-(1,1'-biphenyl)-4,4'-diamine (TTB); N,N'-bis(naphthalen-1-yl)-N,N'-bis-(phenyl)benzidine (α-NPB); and porphyrinic compounds, such as copper phthalocyanine. Commonly used hole transporting polymers include, but are not limited to, poly(9,9,-dioctyl-fluorene-co-N-(4-butylphenyl)diphenylamine), and the like, polyvinylcarbazole, (phenylmethyl)polysilane, poly(dioxythiophenes), polyanilines, and polypyrroles. It is also possible to obtain hole transporting polymers by doping hole transporting molecules such as those mentioned above into polymers such as polystyrene and polycarbonate.

In one embodiment, the buffer layer is formed with polymeric materials, such as polyaniline (PANI) or polyethylenedioxythiophene (PEDOT), which are often doped with protonic acids. The protonic acids can be, for example, poly(styrenesulfonic acid), poly(2-acrylamido-2-methyl-1-propanesulfonic acid), and the like. The buffer layer 120 can comprise charge transfer compounds, and the like, such as copper phthalocyanine and the tetrathiafulvalene-tetracyanoquinodimethane system (TTF-TCNQ). In one embodiment, the buffer layer 120 is made from a dispersion of a conducting polymer and a colloid-forming polymeric acid. Such materials have been described in, for example, published U.S. patent applications 2004-0102577 and 2004-0127637.

Depending upon the application of the device, the electroactive layer 130 can be a light-emitting layer that is activated by an applied voltage (such as in a light-emitting diode or light-emitting electrochemical cell), a layer of material that responds to radiant energy and generates a signal with or without an applied bias voltage (such as in a photodetector). In one embodiment, the electroactive material is an organic electroluminescent ("EL") material, Any EL material can be used in the devices, including, but not limited to, small molecule organic fluorescent compounds, fluorescent and phosphorescent metal complexes, conjugated polymers, and mixtures thereof. Examples of fluorescent compounds include, but are not limited to, pyrene, perylene, rubrene, coumarin, derivatives thereof, and mixtures thereof. Examples of metal complexes include, but are not limited to, metal chelated oxinoid compounds, such as tris(8-hydroxyquinolato)aluminum (Alq3); tetra(8-hydroxyquinolato)zirconium (ZrQ), cyclometalated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly (spirobifluorenes), polythiophenes, poly(p-phenylenes), copolymers thereof, and mixtures thereof.

Optional layer 140 can function both to facilitate electron injection/transport, and can also serve as a confinement layer to prevent quenching reactions at layer interfaces. More specifically, layer 140 may promote electron mobility and reduce the likelihood of a quenching reaction if layers 130 and 150 would otherwise be in direct contact. Examples of materials for optional layer 140 include, but are not limited to, metal chelated oxinoid compounds, such as bis(2-methyl-8-quinolinolato)(para-phenyl-phenolato)aluminum(III) (BAIQ), tetra(8-hydroxyquinolato)zirconium (ZrQ), and tris(8-hydroxyquinolato)aluminum ($Alq_3$); azole compounds such as 2-(4-biphenylyl)-5-(4-t-butylphenyl)-1,3,4-oxadiazole (PBD), 3-(4-biphenylyl)-4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthroline derivatives such as 9,10-diphenylphenanthroline (DPA) and 2,9-dimethyl-4,7-diphenyl-1,10-phenanthroline (DDPA); and any one or more combinations thereof. Alternatively, optional layer 140 may be inorganic and comprise BaO, LiF, $Li_2O$, or the like.

The cathode layer 150 is an electrode that is particularly efficient for injecting electrons or negative charge carriers. The cathode layer 150 can be any metal or nonmetal having a lower work function than the first electrical contact layer (in this case, the anode 110). As used herein, the term "lower work function" is intended to mean a material having a work function no greater than about 4.4 eV.

Materials for the cathode layer can be selected from alkali metals of Group 1 (e.g., Li, Na, K, Rb, Cs,), the Group 2 metals (e.g., Mg, Ca, Ba, or the like), the Group 12 metals, the lanthanides (e.g., Ce, Sm, Eu, or the like), and the actinides (e.g., Th, U, or the like). Materials such as aluminum, indium, yttrium, and combinations thereof, may also be used. Specific non-limiting examples of materials for the cathode layer 150 include, but are not limited to, barium, lithium, cerium, cesium, europium, rubidium, yttrium, magnesium, samarium, and alloys and combinations thereof.

The cathode layer 150 is usually formed by a chemical or physical vapor deposition process. In some embodiments, the cathode layer will be patterned, as discussed above in reference to the anode layer 110.

Other layers in the device can be made of any materials which are known to be useful in such layers upon consideration of the function to be served by such layers.

In some embodiments, an encapsulation layer (not shown) is deposited over the contact layer 150 to prevent entry of undesirable components, such as water and oxygen, into the device 100. Such components can have a deleterious effect on the organic layer 130. In one embodiment, the encapsulation layer is a barrier layer or film. In one embodiment, the encapsulation layer is a glass lid.

Though not depicted, it is understood that the device 100 may comprise additional layers. Other layers that are known in the art or otherwise may be used. In addition, any of the above-described layers may comprise two or more sub-layers or may form a laminar structure. Alternatively, some or all of anode layer 110, the buffer layer 120, the electron transport layer 140, cathode layer 150, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; buffer layer 120, 50-2000 Å, in one embodiment 200-1000 Å; optional hole transport layer, 50-2000 Å, in one embodiment 100-1000 Å; photoactive layer 130, 10-2000 Å, in one embodiment 100-1000 Å; optional electron transport layer 140, 50-2000 Å, in one embodiment 100-1000 Å; cathode 150, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

EXAMPLES

The concepts described herein will be further described in the following examples, which do not limit the scope of the invention described in the claims.

General Procedure of Sample Preparation and Work Function Measurement

The polymeric acids used in Examples and Comparative Examples were spin-coated on the surfaces. In the case of indium/tin semiconductive oxide (ITO), 30 mm×30 mm glass/ITO substrates were used. ITO/glass substrates consist of 15 mm×20 mm ITO area at the center having ITO thickness of 100 to 150 nm. At one corner of 15 mm×20 mm ITO area, ITO film surface extended to the edge of the glass/ITO serves as electrical contact with Kelvin probe electrode. Prior to spin coating with a polymeric solution or a dispersion as illustrated in Examples and Comparative Examples, ITO/glass substrates were cleaned and the ITO side were subsequently treated with UV-ozone for 10 minutes. Once spin-coated with a polymeric acid, the deposited polymer layer on the corner of the extended ITO film was removed with a water-wetted cotton-swath tip. The exposed ITO pad was for making contact with Kelvin probe electrode. The deposited film was then baked in air at ~120° C. for 10 minutes. The baked samples were then placed on a glass jug flooded with nitrogen before capped.

For work-function measurement of surfaces, ambient-aged gold film was measured first as a reference prior to measurement of samples. The gold film on a same size of glass piece was placed in a cavity cut out at the bottom of a square steel container. On the side of the cavity, there are four retention clips to keep sample piece firmly in place. One of the retention clips is attached with electrical wire for making contact with the Kelvin probe. The gold film was facing up while a Kelvin probe tip protruded from the center of a steel lid was lowered to above the center of the gold film surface. The lid was then screwed tightly onto the square steel container at four corners. A side port on the square steel container was connected with a tubing for allowing nitrogen to sweep the Kelvin probe cell while a nitrogen exit port capped with a septum in which a steel needle is inserted for maintaining ambient pressure. The probe settings were then optimized for the probe and only height of the tip was changed through entire measurement. The Kelvin probe was connected to a McAllister KP6500 Kelvin Probe meter having the following parameters: 1) frequency: 230; 2) amplitude: 20; 3) DC offset: varied from sample to sample; 4) upper backing potential: 2 volt; 5) lower backing potential: −2 volt; 6) scan rate: 1; 7) trigger delay: 0; 8) acquisition(A)/data(D) points: 1024; 9) A/D rate: 12405@19.0 cycles; 10) D/A: delay: 200; 11) set point gradient: 0.2; 12) step size: 0.001; 13) maximum gradient deviation: 0.001. As soon as the tracking gradient stabilized, the contact potential difference ("CPD") in volt between gold film was recorded. The CPD of gold was then referencing the probe tip to (5.7-CPD)eV. The 5.7 eV (electron volt) is work-function of ambient aged gold film surface (Surface Science, 316, (1994), P380. The CPD of gold was measured periodically while CPD of samples were being determined. Each sample was loaded into the cavity in the same manner as gold film sample with the four retention clips. On the retention clip making electrical contact with the sample care was taken to make sure good electrical contact was made with the exposed ITO pad at one corner. During the CPD measurement a small stream of nitrogen was flowed through the cell without disturbing the probe tip. Once CPD of sample was recorded, the sample workfunction was then calculated by adding CPD of the sample to the difference of 5.7 eV and CPD of gold.

Example 1

This example illustrates the preparation of poly(perfluoro-2-(2-fluorosulfonylethoxy)propylvinylether ("PSEPVE") and conversion of the sulfonyl fluoride to sulfonic acid. A transparent conductive composite conductor will be formed using ITO as the first layer and PSEPVE as the second layer.

a) Synthesis of PSEPVE Sulfonyl Fluoride Homopolymer

A 1500 ml round bottom flask with a magnetic stir bar and a side arm was loaded with 200 ml of PSEPVE [CF2=CFOCF2CF(CF3)OCF2C2SO2F]. The top of the flask was fitted with a Teflon sleeve holding a T fitting. Nitrogen was run in one side of the T-fitting and out the other side to a mineral oil bubbler so as to provide a positive pressure of nitrogen in the flask. The side arm of the flask was fitted with a rubber septum. A long syringe needle was threaded through the septum down below the surface of the PSEPVE liquid in the flask. Using the syringe needle, nitrogen was bubbled through the PSEPVE vigorously for 1 minute and then more slowly for three hours while stirring magnetically. The nitrogen flow though the syringe needle was stopped while continuing the flow of nitrogen through the T fitting at the top of the flask. Three ml of 0.037 molar HFPO dimer peroxide dissolved in Vertrel XF were injected through the rubber septum. Vigorous nitrogen flow was resumed through the long syringe needle for 1 minute after which the syringe needle was withdrawn and the rubber septum covered over with aluminum foil. Another 3 ml of HFPO dimer peroxide [CF3CF2CF2OCF(CF3) (C═O)OO(C═O)CF(CF3) OCF2CF2CF3] solution was injected on days 2, 4, 7, 9, 11, and 13. On days 16, 18, 20, 23, 25, 27, and 30, additional three milliliters portions of a 0.167 molar HFPO dimer peroxide solution in Vertrel XF [CF3CFHCFHCF2CF3 manufactured by DuPont Company] were injected. On day 32, 2.47 grams of reaction mixture were withdrawn by syringe and allowed to evaporate on a glass plate. This gave 0.99 g of film that dried down further to 0.9 g when heated for 4 days in a 70° C. vacuum oven. On day 37, the reaction mixture was washed into a one liter round bottom flask with about 20 ml of Vertrel XF. Several boiling chips were added and volatiles slowly and carefully were pulled off with a vacuum pump (heavy foaming and then bubbling in spite of magnetic stirring). After 3 days under pump vacuum, the flask was inverted and its contents allowed to drain into Teflon lined tray while warming in a 75° C. vacuum oven over a 2.5 day period.

The product once cooled was 83.68 g of a clear, brittle, somewhat tacky solid. A 1% solution had an inherent viscosity of 0.0278 dL/g in Fluorinert FC-75 at 25° C., an electronic solvent manufactured by 3M thought to be approximate perfluoro(butyltetrahydrofuran. DSC (Differential Scanning Calorimeter) shows a Tg at 6.4° C. on the second heat at 10° C./min under N2. SEC found Mn=~4300 and Mw=9900 versus polystyrene when run in Flutec PP11 [perfluoro(tetradecahydrophenanthrene)] solvent at 125° C. In Thermal Gravimetric Analyses (TGA) a 2.8% weight loss was observed between room temperature and 250° C. with rapid weight loss starting about 300° C.

b) Hydrolysis of PSEPVE Sulfonyl Fluoride Homopolymer for Conversion to Acid Homopolymer The sulfonyl fluoride homopolymer was converted in the following sequence:

1) 15.36 g (34.43 meq $SO_2F$) of the sulfonyl fluoride polymer were used for conversion.
2) 142.17 g of 50:50 Methanol/Water (v/v) was added to the polymer, yielding a 9.75% w/w Polymer/solvent. The polymer/solvent mixture was not a solution.
3) 13.23 g of $(NH_4)_2CO_3$ (137.68 meq) were added.
1) The oil bath was heated to 70° C. until the reaction mixture was clear & homogenous.
2) A small sample was taken out and dried. $^{19}$F-NMR shows the absence of ~δ40, indicating that the sulfonyl fluoride was hydrolyzed to below the detection limit.
6) The mixture was transferred to a bottle and Amberlyst 15 Resin (58.60 g, 275.42 meq) was slowly added to it. This slurry was rolled for approximately 2 hrs.
7) The slurry was vacuum filtered through a Coarse Fritted Funnel.
8) The filtrate was transferred back into the pre-washed bottle.

9) Pre-rinsed (as needed basis) DOWEX Monosphere 550A (OH) (56.02 g, 68.86 meq) and Amberlyst 15 Resin (14.65 g, 68.86 meq) were added to the polymer solution.
10) The resulting slurry was rolled for about 2 hrs.
11) Repeat steps 7 to 10.
12) The slurry was vacuum filtered through a Coarse Fritted Funnel.
13) The polymer solution was transferred back into the pre-washed bottle and Amberlyst 15 Resin (18.31 g, 86.06 meq) was added to it. This slurry was rolled for approximately 2 hrs.
14) The slurry was vacuum filtered through a Coarse Fritted Funnel.
15) The filtrate was transferred to a large round bottom flask, i.e. 3 L, and the Methanol was removed under reduced pressure, leaving only an aqueous solution.

A final concentration of 22.2% (w/w) sulfonic acid PSEPVE homopolymer in water was made. Ion Chromatography shows that one gram of the aqueous liquid contains only 14.5 ppm (part per million) sodium, 5.9 ppm potassium and 6.8 ppm calcium. They are trace contaminants and perhaps from used containers.

Example 2

This example illustrates a composite conductor having a first layer of ITO spin-coated with a second layer of poly (PSEPVE) sulfonic acid.

A 2.16% (w/w) of the sulfonic acid of poly(PSEPVE) made in Example 1 has pH of 1.1. It was filtered through a 0.45 μm HV filter onto an ozone-treated ITO surface. The spin-coater was set at 3,000 RPM for 60 seconds. The film was baked at 120° C. in air for 10 minutes, and was determined to be 16 nm (nanometer). The sample was loaded to the Kelvin probe cell. Contact potential difference (CPD) between the sample and probe tip was measured to be 2.17 volt. Work-function of the acid modified surface is then calculated to be 6.18 eV based on a pre-determined CPD of gold film, which is 0.69 volt.

To determine whether the sulfonic acid homopolymer exists in colloidal form or solution, the aqueous sulfonic acid PSEPVE was dried first with flowing nitrogen. The dried solid went back to water easily. Part of the dried solids was placed in a vacuum oven at 120° C. for two hours while a small stream of nitrogen was flowed through the oven chamber. The baked solids also went back to water in no time at ambient temperature. The baking temperature is far below decomposition temperature of sulfonic acid PSEPVE homopolymer based on TGA. If the solids existed as colloids, the baking would have coalesced the colloids to render the solids insoluble in water. Since the polymer exists as a solution in water, it makes it very easy to control thickness of the layer on transparent conductors or semiconductors. It is even possible to make monolayer on transparent semiconductors or conductors if desired.

Example 3

This example illustrates workfunction of a composite conductor having a first layer of ITO spin-coated with a second layer of poly(PSEPVE) sulfonic acid which has been adjusted to pH 2.9

A small sample of the sulfonic acid of Poly(PSEPVE) made in Example 1 was adjusted to pH 2.9 with a dilute NaOH/water solution. The pH2.9 solution has 7.5% polymer acid and sodium salt. It was filtered through a 0.45 μm HV filter onto an ozone-treated ITO surface. The spin-coater was set at 3,000 RPM for 60 seconds. The film was baked at 120° C. in air for 10 minutes, and was determined to be 48 nm (nanometer). The sample was loaded to the Kelvin probe cell. Contact potential difference (CPD) between the sample and probe tip was measured to be 1.43 volt. Work-function of the ITO surfaces deposited with the partially neutralized poly (PSEPVE) acid is calculated to be 5.44 eV based on a pre-determined CPD of gold film, which is 0.69 volt. In comparison with Example 1, it is evident that addition of cations to the sulfonic acid of poly(PSEPVE) homopolymer has reduced effect on enhancement of work-function. However, it is still higher than ITO, which is shown in comparative Example 1.

Comparative Example A

This comparative example illustrates the work function of ITO

A piece of ITO substrate used for surface modification was treated with UV-ozone for 10 minutes. The sample was loaded o the Kelvin probe cell with ITO facing the Kelvin probe tip. Contact potential difference (CPD) between the ITO and probe tip was measured to be 0.69 volt. Work-function of the surface is then calculated to be 4.9 eV based on a pre-determined CPD of gold film, which is 0.69 volt. The work-function of ITO is much lower than the work-function (6.18 eV) of modified surface with sulfonic acid PVEPVE homopolymer illustrated in Example 2.

Comparative Example B

This comparative example illustrates the work function of ITO spin-coated with poly(styrenesulfonic acid), a non-fluorinated polymeric acid.

In this comparative example, poly(styrenesulfonic acid), PSSA, purchased from PolySciences, Cata.#08770) was used for surface coating on ITO surface. It contains 30% (w/w) PSSA in water. It was diluted to 2.57% (w/w) with water and was filtered through a 0.45 μm HV filter onto an ozone-treated ITO surface. The spin-coater was set at 3,000 RPM for 60 seconds. The film was baked at 120° C. in air for 10 minutes, and was determined to be 30 nm. The sample was loaded to the Kelvin probe cell. Contact potential difference (CPD) between the sample and probe tip was measured to be 0.77 volt. Work-function of the acid modified surface is then calculated to be 4.8 eV based on a pre-determined CPD of gold film, which is 0.69 volt. The workfunction is much lower than the work-function (6.18 eV) of modified surface with sulfonic acid PVEPVE homopolymer illustrated in Example 2.

Example 4

This example illustrates the preparation of a copolymer of tetrafluoroethylene (TFE) and 3,3,4-trifluoro-4-(perfluorosulfonylethoxy)-tricyclo[4.2.1.$0^{2,5}$]-non-7-ene (NBD-PSEPVE), which is subsequently converted to the sulfonic acid form. The resulting polymer is abbreviated as "TFE/NBD-PSEPVE" in sulfonic acid form. The acid copolymer is to be used as a second layer in a composite conductor.

a) Synthesis of 3,3,4-trifluoro-4-(perfluorosulfonylethoxy)-tricyclo[4.2.1.$0^{2,5}$]-non-7-ene (NBD-PSEVE)

A 1000 mL Hastelloy C276 reaction vessel was charged with a mixture of 2,5-norbornadiene (98%, Aldrich, 100 g), and hydroquinone (0.5 g). The vessel was cooled to −6° C., evacuated to −20 PSIG, and purged with nitrogen. The pressure was again reduced to −20 PSIG and 2-(1,2,2-trifluorovinyloxy)-1,1,2,2-tetrafluoroethanesulfonyl fluoride (305 g) was added. The vessel was agitated and heated to 190° C. at which time the inside pressure was 126 PSIG. The reaction temperature was maintained at 190° C. for 6 h. The pressure dropped to 47 PSIG at which point the vessel was vented and cooled to 25° C.

The crude monomer was distilled using a spinning-band column (BP=110-120° C.@40 Torr, 2100 RPM) to afford 361 g of colorless liquid consisting of a mixture of isomers. The chemical structure was confirmed by both GCMS and $^{19}F$ and $^{1}H$ NMR. MS: m/e 372 ($M^+$), 353 (base, $M^+$-F), 289 ($M^+$-$SO_2F$), 173 ($C_9H_8F_3^+$).

b) Synthesis of a TFE and NBD-PSEVE sulfonyl fluoride copolymer

A 400 mL pressure vessel was swept with nitrogen and charged with 74.4 g (0.20 mol) of NBD-PSEVE, 50 mL of Solkane 365 mfc (1,1,1,3,3-pentafluorobutane) and 0.80 g of Perkadox®16N. The vessel was closed, cooled in dry ice, evacuated, and charged with 30 g (0.30 mol) of TFE. The vessel contents were heated to 50° C. and agitated for 18 hr as the internal pressure decreased from 194 psi to 164 psi. The vessel was cooled to room temperature and vented to one atmosphere. The vessel contents were added slowly to excess hexane. The solid was filtered, washed with hexane and dried in a vacuum oven at about 80° C. There was isolated 32.3 g of the white copolymer. Its fluorine NMR spectrum showed peaks at +44.7 (1F, $SO_2F$), −74 to −87 (2F, $OCF_2$), −95 to −125 ($CF_2$, 4F from NBD-PSEVE and 4F from TFE), −132.1 (1F, CF). From integration of the NMR, polymer composition was calculated to be 48% TFE and 52% NBD-PSEVE. GPC analysis: Mn=9500, Mw=17300, Mw/Mn=1.82. DSC: Tg at 207° C. Anal. Found: C, 33.83; H, 1.84; F, 45.57.

b) Hydrolysis of a TFE/NBD-PSEVE Sulfonyl Fluoride Copolymer for Conversion to Acid Copolymer The sulfonyl fluoride polymer of TFE/NBD-PSEVE was converted in the following sequence:

1) 20.00 g (31.33 meq $SO_2F$) of Polymer were used for conversion.
2) 750 mL of 50:50 Methanol/Water (v/v) were added to the polymer. The polymer/solvent mixture was a solution.
3) 12.04 g of $(NH_4)_2CO_3$ (125.30 meq) were added.
4) The oil bath was heated to 70° C. until the Reaction Mixture was clear & homogenous.
5) A small sample was taken out and dried. $^{19}F$-NMR shows the absence of ~δ40, indicating that the sullenly fluoride was hydrolyzed to below the detection limit.
6) Methanol was evaporated by using stirring, a $N_2$ Stream & 50° C. This caused the polymer to gel.
7) DI Water was added in an attempt to re-dissolve the gel particles.
8) The mixture was transferred back into the pre-rinsed bottle and Pre-rinsed DOWEX Monosphere 550A (OH) (205.6 g, 252.7 meq) was added to the polymer/solvent solution. This slurry was rolled for approximately 4 hrs.
9) The slurry was vacuum filtered through a Coarse Fritted Funnel.
10) The filtrate was transferred back into the pre-washed bottle.
11) Pre-rinsed DOWEX Monosphere 550A (OH) (212 g, 260.6 meq) was added to the polymer/solvent solution. This slurry was rolled for approximately 4 hrs.
12) The slurry was vacuum filtered through a Coarse Fritted Funnel.
13) The filtrate was transferred back into the pre-washed bottle.
14) Amberlyst 15 (67.83 g, 318.8 meq) was added to the polymer/solvent solution. This slurry was rolled overnight.
15) The slurry was vacuum filtered through a Coarse Fritted Funnel.
16) The filtrate was transferred back into the pre-washed bottle.
17) Amberlyst 15 (72.52 g, 340.8 meq) was added to the polymer/solvent solution. This slurry was rolled overnight.
18) The slurry was vacuum filtered through a Coarse Fritted Funnel.
19) The filtrate was transferred back into the pre-washed bottle.

A final concentration of 4.10% (w/w) TFE/NBD-PSEVE sulfonic acid copolymer in water was made. Ion Chromatography shows that one gram of the aqueous liquid contains only 5.5 ppm calcium. It is trace contaminant and perhaps from used containers.

Example 5

This example illustrates the work function of a composite conductor having a first layer of ITO spin-coated with a second layer of poly(TFE/NBD-PSEPVE) sulfonic acid.

A 1.04% (w/w) of the poly(TFE/NBD-PSEPVE) sulfonic acid made in Example 4 was filtered through a 0.45 μm HV filter onto an ozone-treated ITO surface. The spin-coater was set at 3,000 RPM for 60 seconds. The film was baked at 120° C. in air for 10 minutes. The polymer layer on ITO was too thin to measure. The sample was loaded to the Kelvin probe cell. Contact potential difference (CPD) between the sample and probe tip was measured to be 2.12 volt. Work-function of the acid modified surface is then calculated to be 6.13 eV based on a pre-determined CPD of gold film, which is 0.69 volt. The workfunction is about the same as that of the ITO coated with 16 nm thick PSEPVE homopolymer sulfonic acid. The comparison of thickness clearly shows that high workfunction can be achieved on a thin layer of PSEPVE homopolymer sulfonic acid too.

Example 6

This example illustrates the preparation of poly(perfluorobutanesulfonimide) having a degree of polymerization of 21:

Inside a nitrogen-purged glove box, a dry 50 mL round bottom flask (RBF) equipped with a stirring bar, reflux condenser, and septum was charged with perfluorobutane-1,4-disulfonyl difluoride (3.662 g, 10 mmol), anhydrous acetonitrile (15 mL), perfluorobutane-1,4-disulfonamide (3.602 g, 10 mmol), and anhydrous triethylamine (5.6 mL, 40 mmol). The solution was heated to a reflux overnight under nitrogen. The solution was transferred to a 500 mL RBF and treated with sodium hydroxide (1.65 g, 41 mmol), calcium chloride (1.1 g, 10 mmol), and 200 mL deionized water. The solution was evaporated on a rotary evaporator under reduced pressure and the residue dried under vacuum. $^{1}H$ NMR (DMSO) showed the absence of triethylamine. The residue was dissolved in 200 mL deionized water, treated with decolorizing carbon, and heated to a reflux. The cooled mixture was treated with filter aid and filtered using a stainless steel filter funnel fitted with a glass microfiber pre-filter and 5.0 μm PTFE membrane filter by applying nitrogen pressure. The filter was washed with additional deionized water to dilute the solution to 400 mL. The clear solution was slowly eluted through an ion-exchange column that contained 200 g of Dowex® 50WX8-100 ion-exchange resin (strongly acidic, 8% cross-link, 50-100 mesh), which had been washed with methanol followed by water and conditioned by eluting with 250 mL 1 N hydrochloric acid followed by deionized water. The acidic aqueous fractions were collected by eluting the column with additional deionized water, evaporated on a rotary evaporator under reduced pressure, and the residue dried under vacuum to give 6.03 g for an 87.9% yield. $^{19}F$ NMR ($CD_3CN$): −120.95 (m, $—CF_2—CF_2—$), −113.78 (m, 2-$CF_2—SO_2—$). The integrations for the sulfonamide ($—CF_2—SO_2—NH_2$) and sulfonic acid ($—CF_2—SO_3H$) end group peaks at −114.33 and −115.45, respectively, indicated a degree of polymerization of 27, which translates to a number average molecular weight of 9,430.

Example 7

This example illustrates the work function of composite conductor having a first layer of ITO spin-coated with a second layer of poly(perfluorobutanesulfonimide).

A polymerization similar to illustrated in Example 6 was carried out for making poly(perfluorobutanesulfonimide). In this polymerization, degree of polymerization (DP) of 12 was obtained. A 1.54% (w/w) of the poly(perfluorobutanesulfonimide) in water was prepared and was filtered through a 0.45 μm HV filter onto an ozone-treated ITO surface. The spin-coater was set at 3,000 RPM for 60 seconds. The film was then baked at 120° C. in air for 10 minutes. The baked film was not smooth, thus thickness varied. The inhomogeneity is perhaps due to low molecular weight of the polymer. The sample was loaded to the Kelvin probe cell. Contact potential difference (CPD) between the sample and probe tip was measured to be 1.80 volt. Work-function of the acid modified surface is then calculated to be 5.81 eV based on a pre-determined CPD of gold film, which is 0.69 volt. The workfunction is still much higher than that (4.9 eV) of UV-ozone treated ITO surface illustrated in Comparative Example 1. It is also much higher than that (4.8 eV) of poly(styrenesulfonic acid) modified ITO.

Example 8

This example illustrates the work function of a composite conductor having a first layer of ITO spin-coated with a second layer of Nafion®, a poly(perfluoroethyleneethersulfonic acid).

A 25% (w/w) aqueous colloidal dispersion of Nafion® having an EW of 1050 was made using a procedure similar to the procedure in U.S. Pat. No. 6,150,426, Example 1, Part 2, except that the temperature was approximately 270° C. The dispersion was diluted with water to form a 12% (w/w) dispersion for the polymerization.

A 2.02% (w/w) of the Nafion® was filtered through a 0.451 μm HV filter onto an ozone-treated ITO surface. The spin-coater was set at 3,000 RPM for 60 seconds. The film was baked at 120° C. in air for 10 minutes and was measured to be 12 nm. The sample was loaded to the Kelvin probe cell. Contact potential difference (CPD) between the sample and probe tip was measured to be 1.87 volt. Work-function of the acid modified surface is then calculated to be 5.9 eV based on a pre-determined CPD of gold film, which is 0.69 volt. The work-function is also high, but not as high as that (6.12 eV) of the ITO coated with 16 nm thick PSEPVE homopolymer sulfonic acid as illustrated in Example 2, and that (6.13 eV) of the ITO spin-coated with Poly(TFE/NBD-PSEPVE) sulfonic acid as illustrated in Example 5. The latter two acids exist as solution in water. This comparison shows that fluoropolymeric acid or perfluoropolymeric acid exists as solution in water may be preferred, especially for extremely thin layer deposition, such as monolayer.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination. The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. A composite conductor having a work function greater than 5.0 eV, comprising a first layer comprising a transparent conductive material, and a second layer consisting of a fluorinated acid polymer, wherein the fluorinated acid polymer has Formula XI:

(XI)

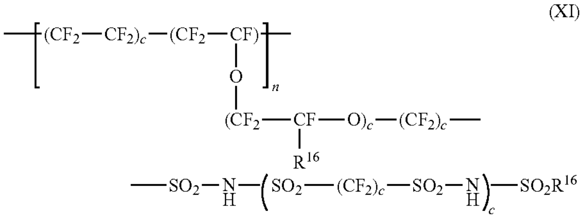

where:

$R^{16}$ is a fluorinated alkyl or a fluorinated aryl group;

c is the same or different at each occurrence and is independently 0 or an integer from 1 to 4; and n is at least 4.

2. A composite conductor of claim 1 wherein the conductive material is selected from mixed oxides of the Group 12, 13, and 14 elements; metals; and conductive polymers.

3. A composite conductor of claim 2 wherein the conductive material is selected from indium-tin-oxide, indium-zinc-oxide, aluminum-tin-oxide, and antimony-tin-oxide.

4. A composite conductor of claim 2 wherein the conductive material is selected from gold, silver, copper, and nickel.

5. A composite conductor of claim 2 wherein the conductive material is selected from homopolymers and copolymers of thiophenes, pyrroles, anilines, and polycyclic aromatics, any of which may be substituted or unsubstituted.

6. An electronic device comprising a composite conductor of claim 1.

* * * * *